Jan. 3, 1967 P. J. DOUNTAS ETAL 3,295,482
ASSEMBLY FOR SUBSURFACE APPLICATION OF NUTRIENT
Filed Feb. 9, 1966 2 Sheets-Sheet 1
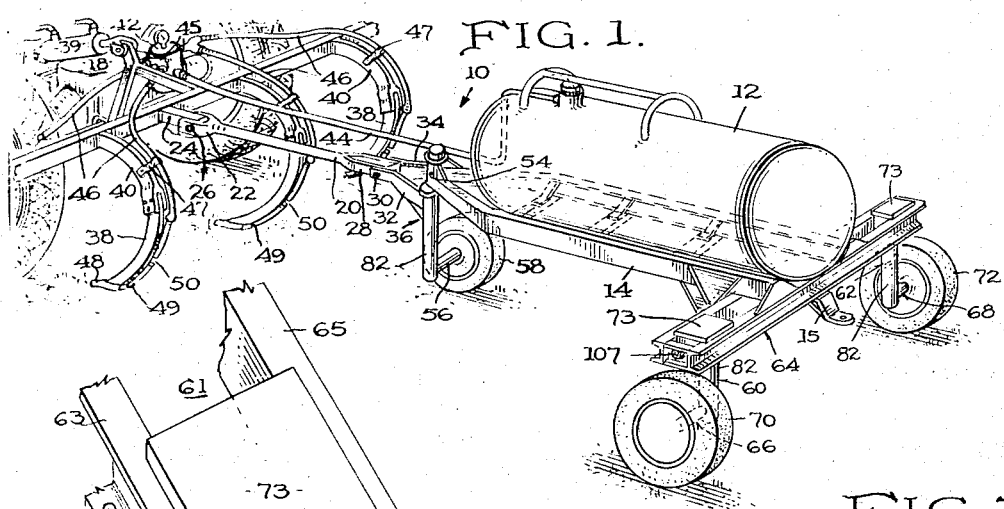
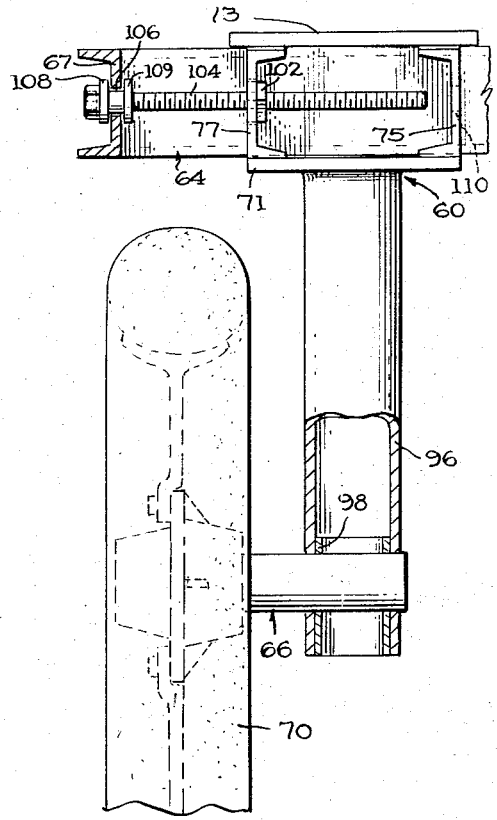
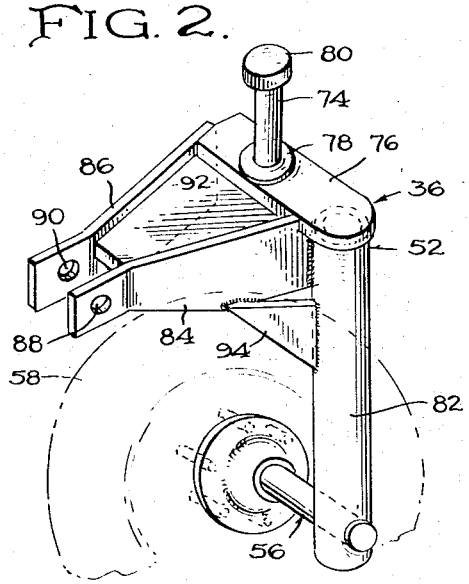
INVENTORS
PETER J. DOUNTAS
RICHARD HOLM
BY *Cameron, Kerkam & Sutton*
ATTORNEYS

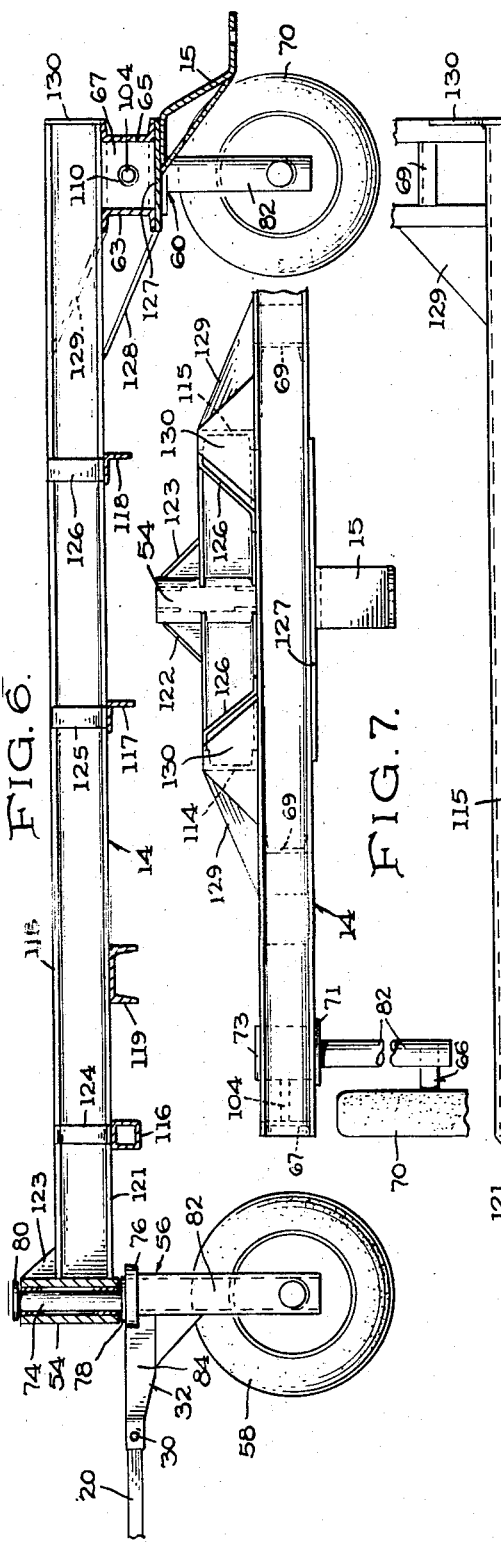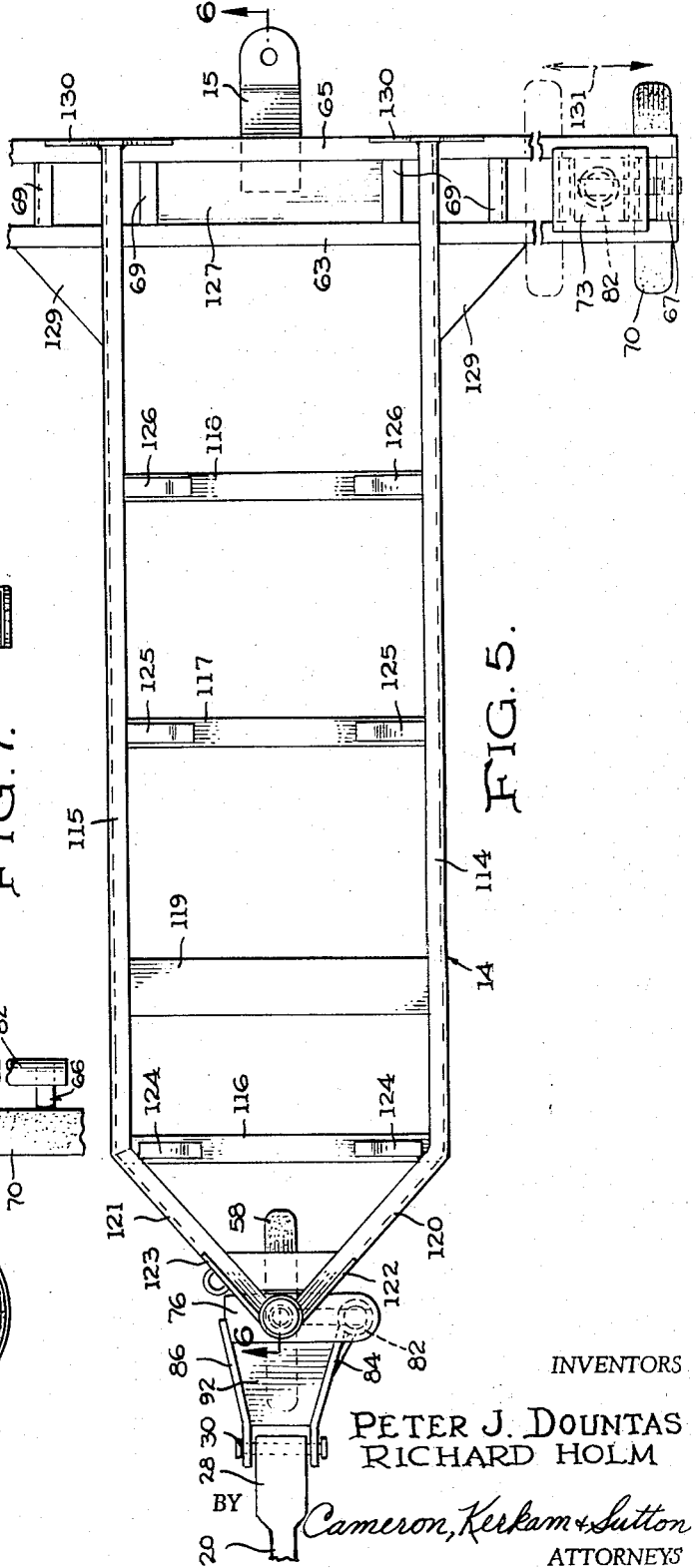

United States Patent Office 3,295,482
Patented Jan. 3, 1967

3,295,482
ASSEMBLY FOR SUBSURFACE APPLICATION OF NUTRIENT
Peter J. Dountas, 608 N. 15th St., Ashland, Nebr. 68003, and Richard Holm, 3750 4th Ave., Council Bluffs, Iowa 15501
Filed Feb. 9, 1966, Ser. No. 526,087
8 Claims. (Cl. 111—7)

The present invention relates generally to chemical applicators for use in injecting nutrients on or into soil and more particularly to a nutrient applicator for injecting anhydrous ammonia into the soil prior to the planting or at the pre-plant stage and between the rows (or top dress) after planting for side dress when the plants have reached a predetermined growth.

It has long been recognized that for successful crop volume and maximum profit to the farmer, it is desirable to plant crops, such as, for example, corn in rows having a minimum spacing. It has become an established practice to plant such crops in rows with a minimum of 40 inch centers, and nutrients are added prior to planting to increase the fertility of the soil. As the crop matures and reaches a height of approximately 12" to 20 inches, nutrients are again added into the soil between the rows in what is called side dress. This procedure was believed to produce the maximum yield per acre, and as could be expected, nutrient applicators to meet these conditions were developed.

One such applicator is shown in U.S. Patent 2,973,728. In this patent, a two-hundred gallon tank is supported on a two wheel frame, the wheels being spaced on 80 inch centers for 40 inch row crop coverage. The frame is hitched to a tractor and hydraulically operated applicator tynes or knives disposed behind the tank are provided for dispensing the nutrient to the soil. A conduit supported directly behind the tynes and connected to the nutrient tank through a regulator valve is provided to select and distribute the proper amount of nutrient to the individual tynes.

This and other known applicator assemblies are subject to several disadvantages. For example, some soil is so hard that the hydraulically operated tynes must be forced into the ground with such force that one or both wheels of the tank assembly are raised off the ground causing the tank assembly to tip over. This often results in equipment breakage and also creates an additional danger to the operator due to the hazard of released chemicals.

In addition, the small capacity of the nutrient distributing tank requires frequent filling from a nurse tank or a carrier tank. To this end, in such applications, there is generally included a large capacity carrier tank having a capacity of approximately one thousand gallons which is used to transport the anhydrous ammonia or other chemical nutrients from a railroad siding to the area of use. A line extending from the large capacity carrier tank is connected to the distributing tank and the chemical nutrients are boosted into the tank. As should be readily apparent, the distributing tank must be refilled at frequent intervals and this transfer of materials in itself presents a dangerous factor that the farmer does not appreciate because it places him in constant danger of the gaseous materials which could harm and disfigure him should any accident occur in the transfer process.

Recent advances by agronomists and the development of improved nutrients available for fertilizing have brought about a change in established planting practices, and resort is now being made to plant crops in rows with reduced centers. 30 inch centers are frequently used and result in an increase in yield over crops planted in rows with 40 inch centers with no serious decrease in quality of the crop. It has also been found that crops may be planted in rows with even closer centers where the soil has a sufficient capacity and fertility to produce crops of the desired quality. Thus, known applicators such as shown in U.S. Patent No. 2,973,728, which utilized fixed radius wheels at approximately 80 inch centers are limited in application to those fields having crops planted in rows with 40 inch centers.

Another disadvantage of fixed radius two wheel applicator assemblies, and fixed radius four wheel applicator assemblies which are sometimes used with large capacity distributing tanks, is that they require a large turning radius which necessitates the reservation of useable ground for tractor operation and reduces the output that can be taken from available acreage. Also, the four wheel tractor assemblies utilize an axle height approximately of 12 inches which limits their use to the pre-plant stage of the nutrient application process.

These and other disadvantages of known arrangements are overcome by the present invention which provides an anhydrous ammonia applicator having axially adjustable rear wheels and a tri-cycle three wheel support assembly provides for a short turning radius back into the working rows of the field. A tank of large capacity is provided to minimize field filling, bleeding loss and attendant dangers during the transfer process, and the applicator knives are positioned directly behind the tractor while pulls the tank supporting frame so as to permit the tractor operator to have the knives in full view at all times and control the depth and distribution of the nutrient. Further, the large capacity applicator tank is preferably supported at least 30 inches above the ground to permit the same unit to be used for pre-plant and side dress with maturing crops.

As can be readily appreciated, such a construction as compared with conventional applicators offers many other practical advantages. While the specification concludes with claims particularly pointing out and distinctly claiming the subject matter of the present invention, it is believed the invention will be more clearly understood from the following detailed description thereof taken in connection with the accompanying drawings; however, it is to be expressly understood that these drawings are for the purpose of illustration only and are not intended to represent the full scope of the invention which is defined by the appended claims.

In the drawings, wherein like characters represent like parts throughout the several views:

FIG. 1 is a fragmentary, perspective view of the nutrient applicator assembly embodying the present invention;

FIG. 2 is a perspective view of the front wheel support for the main frame, the wheel being shown in outline form;

FIG. 3 is a fragmentary side elevational view partially in cross section of one of the rear wheel supports for the main frame;

FIG. 4 is a fragmentary, perspective view of one of the rear wheel supports for the main frame;

FIG. 5 is a plan view, partly broken away of the nutrient tank supporting frame;

FIG. 6 is a side elevational view taken along lines 6—6 of FIG. 5 with the front wheel shown in full; and FIG. 7 is a fragmentary, rear elevational view of the nutrient tank supporting frame.

Referring to the drawing, and in particular FIG. 1, reference number 10 generally designates a nutrient applicator assembly for subsurface application of chemical nutrients such as, for example, anhydrous ammonia. A storage tank 12 which preferably has a capacity of at least 500 gallons or more is carried on a main frame 14 hitched to a tow bar 16 of tractor 18 by means of tongue bar 20. One end of tongue bar 20 includes a clevis plate 22 which is secured to a draw bar 24 extending from the tractor tow bar by a pin member 26. The other end of tongue bar 20 includes a tongue channel 28 which is advantageously secured by a pin 30 between a pair of side plates 32 and 34 mounted to the forward axle frame indicated in general by reference character 36.

A plurality of cultivator tynes or knives 38, only three of which are shown for the purpose of illustration, are secured to the tow bar 16 by means of arms 40. Knives 38 are adapted to extend below the surface of the ground as the trailer is driven to plow furrows in the field. To this end, the tow bar 16 may be raised or lowered, as desired, by the operator through a conventional hydraulic mechanism 39.

Advantageously, knives 38 are mounted between the tractor and the main frame 14 directly behind and in full view of the tractor operator, and a regulating valve 42 for controlling the distribution of the nutrient from storage tank 12 is mounted to the tow bar to permit the operator to control the amount of nutrient dispensed and minimize root damage on side dress. Valve 42 is a conventional regulating valve and includes an inlet 41 connected to the storage tank fill valve 43 by conduit 44 and a plurality of outlets 45, each of which has connected thereto a distributing conduit 46. Each distributing conduit 46 is individually supported to the rear of one of the knives 38 by a suitable clamp 47 and has its free end 49 disposed adjacent the rear of a hard plow point bar 48 secured to the lower end of the knife. A relief portion 50 may be advantageously provided near the free end of each conduit 46 to protect against freezing of the nutrient.

Frame 14 is propelled across the field by a three-wheel support assembly which provides for a short turning radius and maximum utilization of acreage and which also permits the applicator assembly to be utilized for injecting the nutrients into the soil at pre-plant as well as for side dress. To this end, the forward axle unit 36 at the front end of frame 14, as viewed in the drawing, comprises an axle frame 52 rotatably supported in hub 54. Axle frame 52 in turn supports the front axle unit 56 to which is mounted front wheel 58. The rearward end of frame 14, as viewed in the drawing, includes a pair of axle frames 60 and 62 adjustably supported to cross member 64. Each axle frame 60 and 62 in turn supports a rear axle unit 66 and 68, respectively, to which the rear wheels 70 and 72 are mounted. A tow bar 15 extending from the rear of the main frame 14 allows for connection of tank carrier frames in tandem.

Referring to FIG. 2, axle frame 52 includes a king pin 74 secured to platen 76 and adapted to be rotatably supported in the hub 54 of frame 14 between thrust washer 78 and top collar 80. Front axle unit 56 is mounted to a vertically disposed post 82 secured to the underside of platen 76 such that wheel 58 is supported along the central longitudinal axis of main frame 14. A pair of side plates 84 and 86 extend forwardly from platen 76 and are provided with suitable apertures 88 and 90 for receiving pin 30 to secure thereto the tongue bar 20. Side plates 84 and 86 are supported in spaced arrangement by a horizontally extending spreader plate 92 and brace plate 94 secured to post 82 by welding or the like.

As more clearly shown in FIGS. 3 and 4, the rear axle frames are slidingly supported on cross member 64 to allow adjustment of the wheel centers for fields planted with different crop row centers. Each rear wheel 70 and 72 is supported in an identical fashion and, accordingly, only the construction of one wheel support will be described.

Referring to FIG. 3 wheel 70 is rotatably supported on a rear axle unit 66 which is in turn affixed to a vertically disposed post 96 which may be provided with a reinforcing pipe 98 secured therein. Post 96 extends downwardly from the axle frame 60 which is slidingly supported on cross member 64 comprising a pair of rails 63 and 65 supported in spaced arrangement by cross pieces 67 and 69.

Axle frame 60 includes a bottom plate 71, top plate 73, inner stand off plate 75 and outer stand off plate 77 which form a box-like housing. The bottom plate 71 and top plate 73 extend slightly beyond the spacing 61 between rails 63 and 65 of the cross member. In this manner, the top plate 73 rides along the top surface of the rails while the bottom plate 71 rides along the under surface of the rail. Bottom plate 71 may be provided with a plurality of spaced apertures 79 disposed for alignment with similar apertures 81 provided in rails 63 and 65 of cross member 64 so that the rear axle frames may be rigidly secured to the cross member in their adjusted position by suitable pins or bolts (not shown).

To effect cross-wise or transverse adjustment of the wheel centers, the outer stand off plate 77 is provided with an aperture 100 and a threaded sleeve or nut 102 secured therein or adjacent thereto by welding or the like. Nut 102 has in threaded engagement therewith a threaded member 104 which may be a helical shaft, threaded bolt or the like. The outer or free end of threaded member 104, as viewed in the drawing, is rotatably supported in an aperture 106 provided in cross piece 67 by means of a sleeve 107 having raised shoulders 108 and 109 disposed on opposite sides of aperture 106. Sleeve 107 forms an adjustment cap and is advantageously affixed to the outer end of the threaded member 104 to permit rotation thereof and adjustment of the wheel centers. Inner stand off plate 75 is provided with a clearance aperture 110 which allows the threaded member 104 to extend therebeyond for maximum inward adjustment of the axle frame.

Referring to FIGS. 5, 6 and 7, main frame 14 comprises a pair of longitudinally extending side rails 114 and 115 joined by transverse cross members 116, 117, 118 and 119. A pair of obliquely extending rails 120 and 121 form a support at the forward end of the frame for hub 54 which supports the front axle unit 36 and which is further supported to the rails by a pair of gussets 122 and 123. Mounted to rails 116, 117 and 118 are three pairs of braces 124, 125 and 126 which form a cradle for supporting the storage tank 12 on the main frame 14. Braces 124, 125 and 126 are advantageously contoured to insure against collapse of longitudinal members and reduce torsionac loads.

To the rear and to the underside of frame 14, as viewed in the draiwngs, is supported the cross member 64 which is secured thereto by tie plate 127, bottom gussets 128, top gussets 129 and rear rail gussets 130.

In operation, the wheel centers are preset in accordance with the row centers of the field to be fertilized. As hereinbefore described, generally the wheels may be slidingly set as desired from 80 inch centers to 60 inch centers for 20, 30 or 40 inch crop coverage as indicated by the arrow 131 in FIG. 5, and the height for side dress application is set for 30 inch clearance; however, it should be apparent that these are the most frequently used settings and the wheel centers may be varied in accordance with the present invention to accommodate various situations. The front wheel support shows a turning radius of approximately 120° which permits maximum utilization of acreage.

Although the invention has been described and illustrated with regard to particular embodiments, it will be obvious to those skilled in the art that various modifications may be made, and it is therefore intended by the appended claims to cover all such modifications which fall within the scope of the invention.

What is claimed is:
1. A nutrient applicator assembly comprising a main frame adapted to support a nutrient tank and to be attached to a tractor having a rearwardly disposed adjustable tow bar supporting a plurality of spaced nutrient applicating means operably connected to said tank and mounted to said tow bar between said tractor and said main frame for subsurface application of the nutrient, said main frame including a cross member transverse to the longitudinal axis and a single forward axle unit for supporting a front wheel having a turning radius of 120° and a pair of rear axle units for supporting a pair of rear wheels adapted to propel the main frame over the ground, said forward and rear axle units providing a tri-cycle support for said main frame, said forward axle unit including an axle frame for rotatably supporting said front wheel to said main frame, each of said rear axle units including a rear axle frame slidingly supported to said main frame, means for adjustably sliding said rear axle frames transversely of the longitudinal axis thereof, said means including a threaded member threadingly engaging each rear axle frame and rotatably supported to said cross member on opposed sides to effect adjustment of the wheel centers of the rear wheels upon rotation of the threaded members and means for rigidly securing the rear axle frames to said main frame in a selected position for pre-plant and side dress application of the nutrient.

2. A nutrient applicator assembly as set forth in claim 1 wherein each of said rear axle frames is slidingly supported to said cross member and adapted to be rigidly secured thereto on 20, 30 or 40 inch wheel centers.

3. A nutrient applicator assembly as set forth in claim 2 wherein said frame has a bottom clearance above ground level of at least 30 inches to permit side dress of maturing crops.

4. A nutrient applicator assembly as set forth in claim 1 wherein each threaded member is disposed parallel to said cross member and further including means affixed to one end of said threaded member for rotating said threaded member, the other end of said threaded member cooperatively engaging a corresponding axle unit to thereby effect said transverse displacement of the rear axle frame upon rotation of the threaded member.

5. A nutrient tank supported adapted to be hitched to the tow bar of a tractor for carrying a nutrient distributing tank operably connected to a plurality of spaced nutrient applicators supported on said tow bar for metered distribution of the nutrient to a field comprising, a main frame having a tri-cycle support, said main frame comprising a pair of parallel, longitudinally extending side rails, a plurality of transverse cross members joined to said side rails, a pair of inwardly extending rails disposed at the front end of said frame and being joined at a common point to support a hub, a forward axle unit for supporting a front wheel including an axle frame rotatably supported in said hub such that said front wheel has a turning radius of 120°, a pair of opposed rear axle units each including an axle frame adapted to slidingly support a rear wheel, a transverse cross bar secured to the rear and underside of said side rails arranged for slidingly supporting each of the rear axle frames on said cross bar and means for rigidly securing the axle frames in an adjusted position such that said rear wheels are set on predetermined centers of 20, 30 or 40 inches.

6. A nutrient tank support as set forth in claim 5 wherein said means for slidingly supporting each of the rear axle frames includes for each axle frame a first plate disposed above said cross bar and in sliding relationship therewith, a stand off plate depending from said first plate and a threaded member having one end rotatably supported on said cross bar and having its other end in threaded engagement with said stand-off plate to effect transverse adjustment of the wheel centers of the rear wheels upon rotation of the threaded member.

7. A nutrient tank support as set forth in claim 6 further including a second plate disposed below said cross bar and in sliding relationship therewith, said second plate being rigidly connected to said stand off plate, said second plate having a plurality of spaced apertures, said cross bar having a plurality of spaced apertures, the apertures of said second plate and said cross bar being disposed for coaxial alignment upon transverse adjustment of said rear axle frames and adapted to receive a securing pin through the aligned apertures to effect rigid placement of said rear wheels on predetermined wheel centers of 20, 30 or 40 inches.

8. A nutrient tank support as set forth in claim 6 wherein said forward axle frame includes a king pin adapted to be rotatably supported in said hub, a horizontal platen secured to said king pin, a vertically disposed post depending from said platen for supporting the front wheel, and a pair of side plates disposed to extend forwardly of said platen and adapted to be hitched to the tow bar of the tractor.

References Cited by the Examiner

UNITED STATES PATENTS

| 1,897,885 | 2/1933 | Borocki | 172—507 X |
| 2,563,372 | 8/1951 | Risse | 280—34 |
| 2,781,733 | 2/1957 | Graham | 111—7 |
| 2,973,728 | 3/1961 | Garretson | 111—6 |
| 3,218,999 | 11/1965 | Pattison | 111—7 |

ABRAHAM G. STONE, *Primary Examiner.*

R. E. BAGWILL, *Assistant Examiner.*